US008517768B2

(12) United States Patent
Blaha et al.

(10) Patent No.: US 8,517,768 B2
(45) Date of Patent: Aug. 27, 2013

(54) BREAKAWAY FUSE HOLDER

(75) Inventors: William E. Blaha, St. Charles, IL (US); Mark B. Higgins, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 173 days.

(21) Appl. No.: 13/208,149

(22) Filed: Aug. 11, 2011

(65) Prior Publication Data
US 2013/0037294 A1 Feb. 14, 2013

(51) Int. Cl.
*H01R 13/68* (2011.01)
(52) U.S. Cl.
USPC ....... 439/620.28; 337/195; 337/201; 337/205
(58) Field of Classification Search
USPC ............... 439/620.28, 620.26; 337/205, 195, 337/201, 214, 192, 213, 198
See application file for complete search history.

(56) References Cited

U.S. PATENT DOCUMENTS

| | | | |
|---|---|---|---|
| 3,356,806 A | 12/1967 | Urani | |
| 3,417,359 A | 12/1968 | Urani | |
| 3,518,600 A | 6/1970 | Urani | |
| 3,629,808 A * | 12/1971 | Andreaggi et al. | 439/544 |
| 3,753,192 A | 8/1973 | Urani | |
| 4,734,059 A * | 3/1988 | Melugin | 439/620.28 |
| 4,759,730 A | 7/1988 | Sappington et al. | |
| 4,826,454 A * | 5/1989 | Kissling et al. | 439/620.28 |
| 4,909,761 A | 3/1990 | Muguira | |
| 5,018,991 A | 5/1991 | Katz et al. | |
| 5,088,683 A | 2/1992 | Briden | |
| D326,845 S | 6/1992 | Katz et al. | |
| 5,335,160 A | 8/1994 | Savoca | |
| 5,427,542 A | 6/1995 | Gerow | |
| 5,648,749 A * | 7/1997 | Lin et al. | 337/205 |
| 5,888,098 A | 3/1999 | Cheng et al. | |
| 5,993,246 A | 11/1999 | Moldenhauer et al. | |
| RE40,228 E | 4/2008 | Savoca | |
| 2013/0037294 A1 * | 2/2013 | Blaha et al. | 174/50 |

OTHER PUBLICATIONS

Cooper Bussmann, Iron In-Line Fuse Holders, 2008, 3 pages.
Ferraz Shawmut, FEB, FEC, FEX, FEY, 600 Volt/In-Line Fuse Holders, 4 pages.
Littelfuse, In-Line Watertight Fuseholders, 2005, 6 pages.
Cooper Bussmann, TRON In-Line Fuseholders, Jul. 16, 2003, 2 pages.

* cited by examiner

*Primary Examiner* — James Harvey
(74) *Attorney, Agent, or Firm* — Greenberg Traurig, LLP

(57) ABSTRACT

A device for holding an electric fuse assembly having a fuse carried by a first end fuse holder and a second end fuse holder. The assembly includes a first housing section having a cavity formed therein for receiving the first end fuse holder and a second housing section having a cavity formed therein for receiving the second end fuse holder. An end of the second housing section is adapted to be separably coupled with an end of the first housing section by placing an interior surface at the end of the first housing section into overlapping engagement with an exterior surface of the second end fuse holder and an interior surface of the second end fuse holder into overlapping engagement with an exterior surface at the end of the first housing section. Such a coupling functions to provide a moisture resistant seal. Respective surfaces of the first end fuse holder and the second end fuse holder may also be placed into overlapping engagement with each other when the first housing section and the second housing section are placed into engagement. At least one of the first and second housing sections may also be adapted to latch to the first and second fuse holders, respectively.

30 Claims, 7 Drawing Sheets

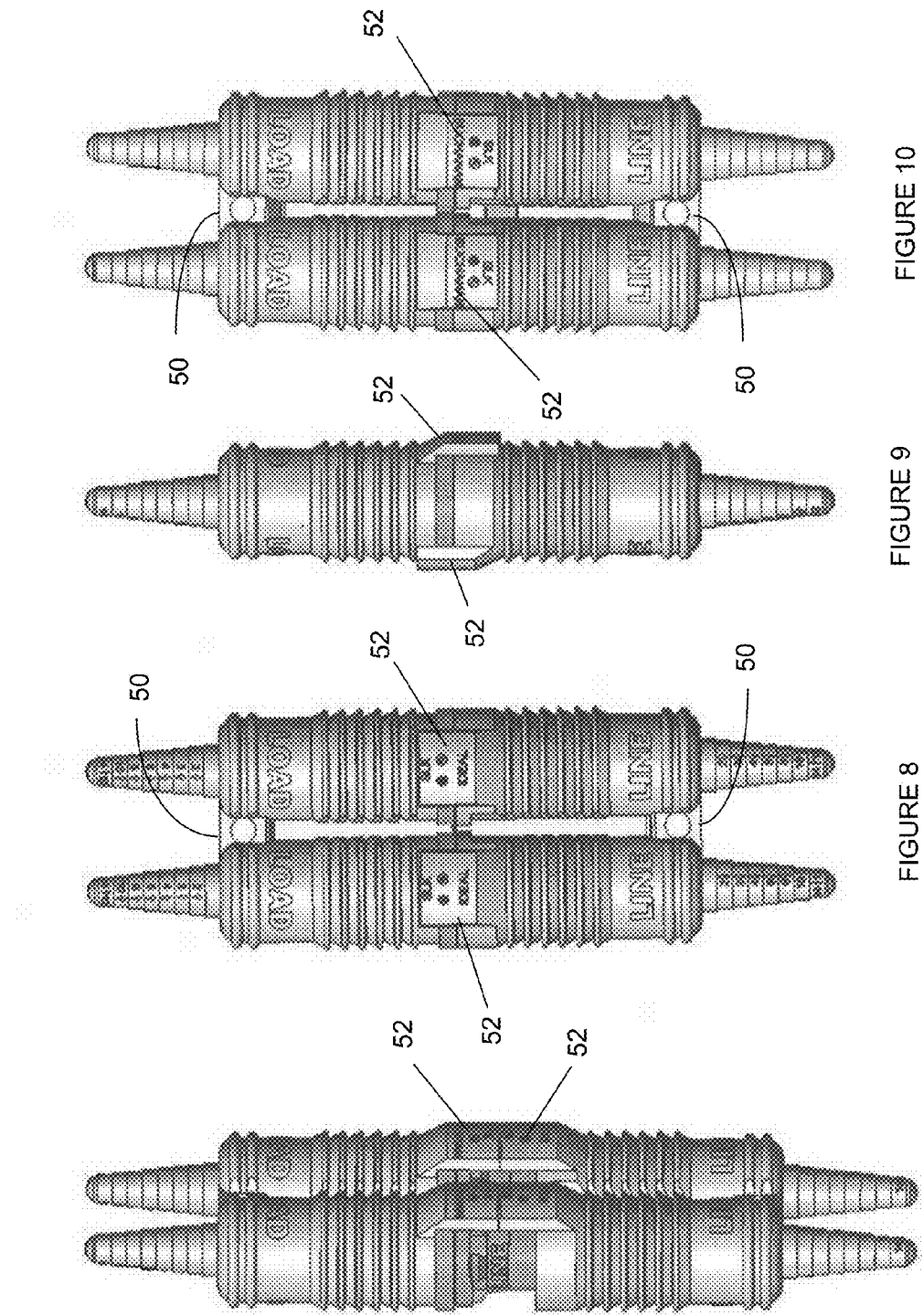

BREAKAWAY FUSE HOLDER

BACKGROUND

Assemblies for holding a fuse, particularly for use in connection with a breakaway, outdoor lighting pole such as disclosed in U.S. Pat. Nos. 5,088,683 and 5,335,160, are known in the art. By way of example, U.S. Pat. No. 4,909,761 describes a holder for an electric fuse having a first receiving body which has an internally threaded nut assembled thereto in a manner that allows for relative rotation between the nut and the body. The assembly of the nut to the body allows separation of the nut from the body when a predetermined axial separating force is imparted between the parts. A second fuse receiving body has an external thread which engages the thread of the first body. As the threaded connection is made the body sections are drawn together to enclose the fuse therein.

Further examples of fuse holding and breakaway connector assemblies may also be seen in U.S. Pat. Nos. 5,993,246, 5,888,098, 5,427,542, D326,845, 5,018,991, 4,909,761, 3,753,192, 3,518,600, 3,417,359, and 3,356,806.

Each of these references is incorporated herein by reference in its entirety.

SUMMARY

Described hereinafter are improved assemblies for holding a fuse, particularly for holding a fuse in a breakaway lighting or traffic pole, an electric vehicle charging station, and the like. The assembly includes a first housing section having a cavity formed therein for receiving a first end fuse holder and a second housing section having a cavity formed therein for receiving a second end fuse holder. An end of the second housing section is adapted to be separably coupled to an end of the first housing section, particularly via the second end fuse holder, whereupon an interior surface at the end of the first housing section will be placed into overlapping engagement with an exterior surface of the second end fuse holder and an interior surface of the second end fuse holder will be placed into overlapping engagement with an exterior surface at the end of the first housing section to provide a moisture resistant seal. Respective surfaces of the first end fuse holder and the second end fuse holder may also be placed into overlapping engagement with each other when the first housing section and the second housing section are coupled together in this manner. At least one of the first and second housing sections may also be adapted to latch to the first and second fuse holders, respectively.

While the foregoing provides a general description of the subject assemblies for holding a fuse, a better understanding of the objects, advantages, features, properties, and relationships of the subject assemblies will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the hereinafter described assemblies for holding a fuse, reference may be had to the following drawings in which:

FIGS. 7-10 illustrate a fuse holder assembly having a formed line side housing pair and a formed load side housing pair which are keyed to prevent miscoupling.

DETAILED DESCRIPTION

Figure 1:
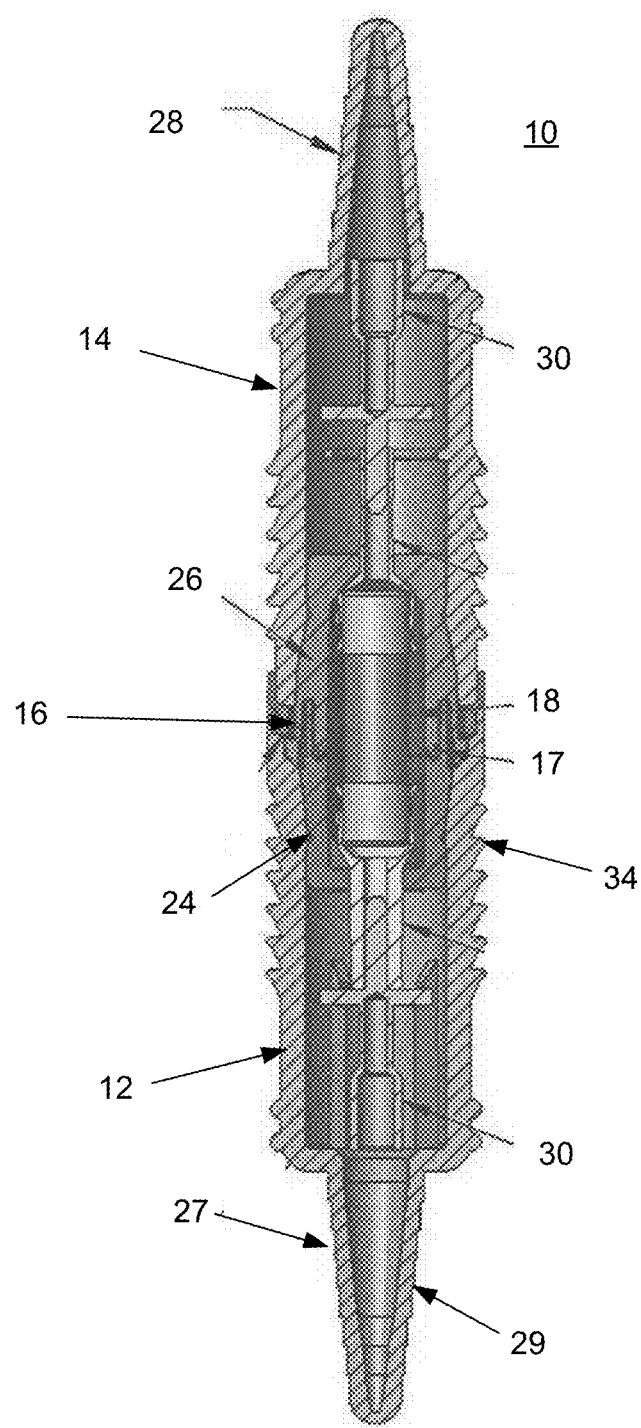
FIGS. 1 and 2 illustrate a cross-sectional view of an exemplary fuse holding assembly constructed according to the description that follows.

Turning now to the Figures, in which like reference numerals refer to like elements, illustrated are various assemblies that are usable to hold a fuse. While it is contemplated that the described fuse holding assemblies would be used in connection with a breakaway lighting or traffic pole, an electric vehicle recharging station, or the like, such applications are not intended to be limiting. Rather, those of skill in the art will appreciate that the described fuse holding assemblies could be used in any application in which a break-away fuse is desired to be employed.

Figure 2:
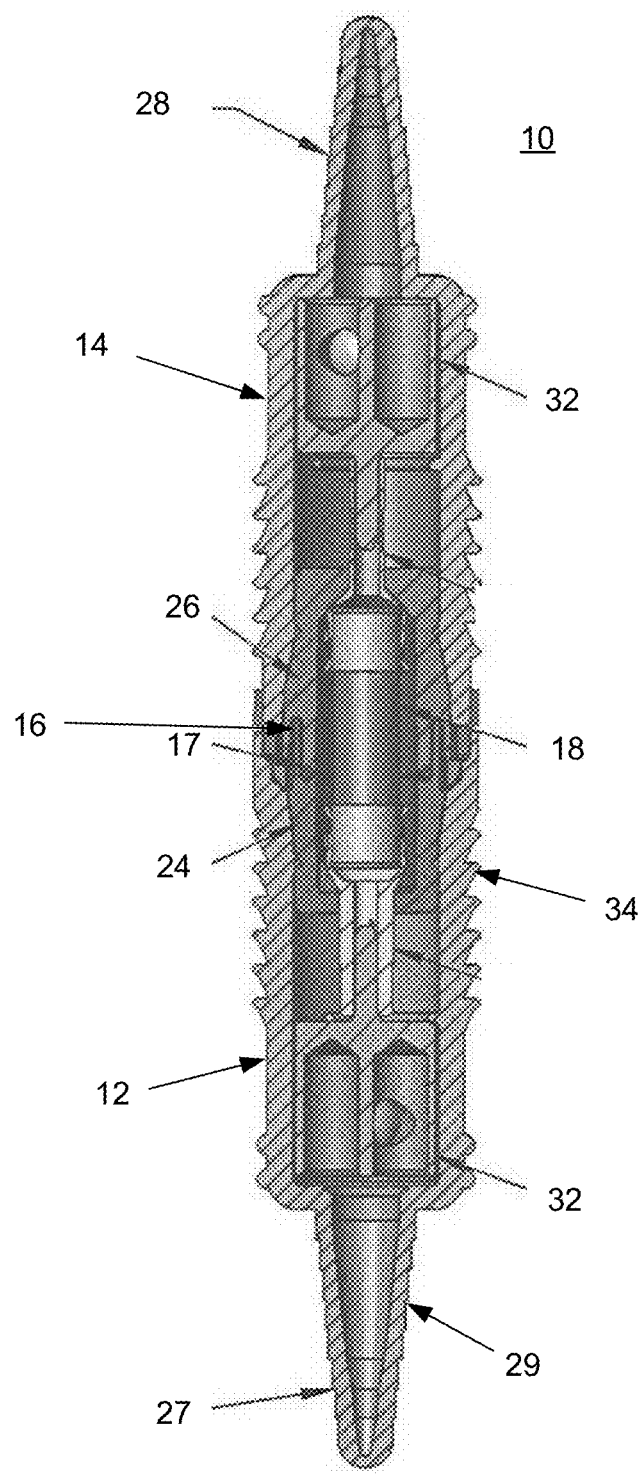

Referring now to FIGS. 1 and 2, a fuse holding assembly 10 includes a line side boot 12 and a load side boot 14. The line side boot 12 and the load side boot 14 are preferably constructed from a thermoplastic vulcanizate, often referred to as "TPV" and which is a thermoplastic elastomer. These materials are currently sold under the "Sarlink" and "Santoprene" brand names. While other materials may be utilized in the construction of the line side boot 12 and the load side boot 14 as appropriate for any particular application, the above-mentioned materials are particularly advantageous when the fuse holding assembly 10 is to be used outdoors as the above-mentioned materials are unappealing to rodents and/or fire ants, i.e., rodents and/or fire ants will not eat these materials. In addition, certain of these materials, such as "Amcoflex" sold by Amco, also have the advantage of being fire retardant.

The line side boot 12 is adapted to be releasably coupled with the load side boot 14 in a manner described in greater detail hereinafter. When assembled per the description that follows, the fuse holding assembly 10 has an interior space that is size and arranged to hold a fuse assembly 16. The fuse assembly 16 generally comprises a fuse 18, a line side, breakaway type fuse holder 24, and a load side fuse holder 26. The fuse holders 24/26 are preferably constructed from a polypropylene material, an olefin which is a wax like material, which material has the advantage that water and moisture will bead up upon the material.

Wires for connecting the fuse assembly 16 to the electrical system are to be fed through entry towers 27 and 28 provided to the line side boot 12 and load side boot 14, respectively. The entry towers 27 and 28 are adapted to be cut to accept wires of a desired gauge and, to this end, the entry towers 27 and 28 may be provided with steps 29, lines, or the like and may also be provided with gauge size markings to indicate a gauge of wire that will be accepted within an entry tower 27 and 28 when the entry tower 27 and 28 is cut at a given step, line, or the like. Once fed into the respective boots 12 and 14, the wires may be attached to the fuse assembly 16 by means of a crimp lug 30 as illustrated in FIG. 1, a set screw lug 32 as illustrated in FIG. 2, or the like. It is to be further appreciated that the boots 12 and 14 may include a single wire entry tower or a double wire entry tower and, when assembled, the fuse holding assembly 10 can thus be of the one wire in with one wire out type, the two wires in with two wires out type, or any combination thereof.

To assist in assembling and/or disassembling the fuse holding assembly 10, the line side boot 12 and the load side boot 14 may be provided with gripping surfaces, for example by providing ridge lines 34 to the outer surfaces of the boots 12 and 14 in an area to be grasped by the user.

Figure 6:
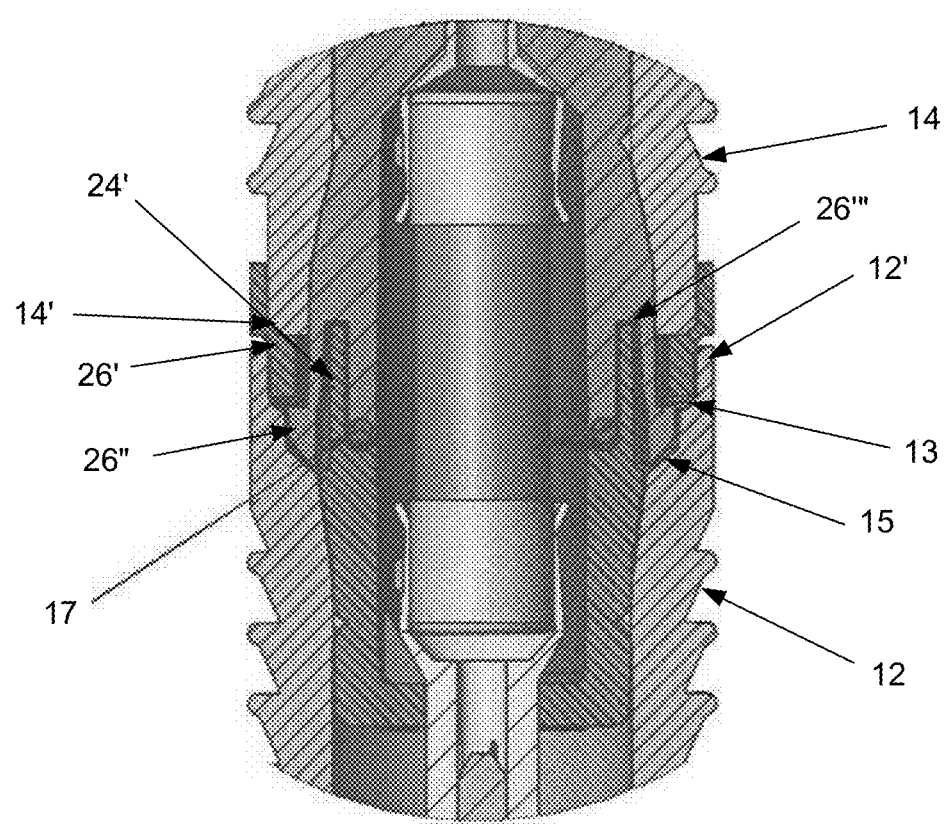
FIG. 6 illustrates a portion of the fuse-holding assembly which provides the assembly with a moisture resistant seal to protect the electrical components housed therein.
Figure 11:
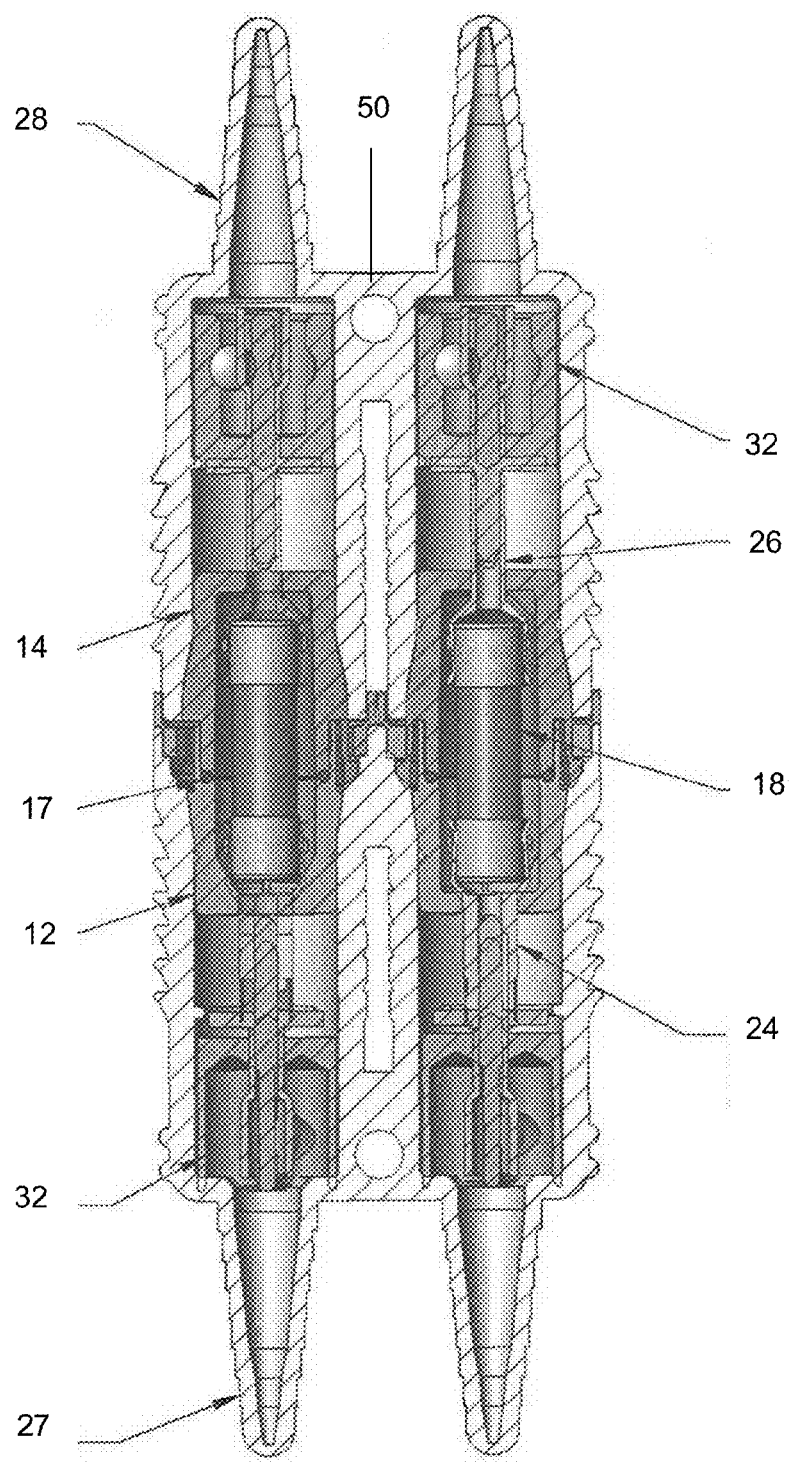
FIG. 11 illustrates a cross-sectional view of the fuse holder assembly of FIGS. 7-10 in the exemplary form of a set screw lug type.

To assemble the fuse holding assembly 10, and thereby protect the interior space of the fuse holding assembly 10 from moisture, the line side boot 12, the load side boot 14, and the fuse holder 26 are sized and arranged to be placed into overlapping engagement. More particularly, with reference to FIGS. 3 and 6, to assemble the fuse holding assembly 10 an interior surface of the end or rim 12' of the line side boot 12 is placed into overlapping engagement with an exterior surface of a lip portion 26' of the load side fuse holder 26 while an interior surface of the lip portion 26' of the load side fuse holder 26 is placed into overlapping engagement with an exterior surface of an end or rim 14' of the load side boot 14. During such assembly, the lip portion 26' and end portion 26'' of the load side fuse holder 26 will also be placed into engagement with stepped surfaces 13 and 15 formed on the interior of the line side boot 12. As will be appreciated, this arrangement of cooperating elements functions to seal of the interior space of the fuse holding assembly 10 against moisture. This sealing arrangement may be further enhanced by providing an extended portion 24' to the line side fuse holder 24 which extended portion 24' is arranged to be received into and engaged with a correspondingly arranged cutout 26' provided in the load side fuse holder 26 when the fuse holder assembly 10 is assembled in the manner described above. An o-ring 17, made of silicone, rubber, gasket material, or the like material that can be compressed to form a seal, is further positioned between the line side fuse holder 24 and the load side fuse holder 26. For example, the o-ring 17 could be positioned interiorly adjacent to where the extended portion 24' meets the upper surface of the line side fuse holder 24. In this regard, the o-ring 17 sits in a pocket around the interior diameter of the line side fuse holder 24 while the load side fuse holder 26 is designed to engage the o-ring 17 and compress it to form a water-tight seal. The o-ring 17 could also be placed in the side wall between the line side fuse holder 24 and the load side fuse holder 26 to create the same seal. As will be appreciated, more than one o-ring can be used for this purpose. The described overlapping arrangement of the two fuse holder halves 24 and 26 with the cooperation of the o-ring 17 additionally prevent moisture from entering the interior of the fuse holding assembly 10. As will also be appreciated, the lip portion 26' of the load side fuse holder 26 may be an integral part of the load side fuse holder 26 or may be provided by use of another element that is arranged as illustrated.

For maintaining the line side fuse holder 24 within the line side housing 12, particularly when the fuse holding assembly 10 is of the crimping type shown in FIG. 1, the line side housing 12 is provided with an interior surface feature that is adapted to engage or latch with a corresponding feature provided to line side fuse holder 24. In this regard, as particularly illustrated in FIG. 3, the interior surface feature may comprises an inwardly extending ridge 36 that is arranged to grasp a correspondingly arranged indentation formed in the line side fuse holder 24. To facilitate insertion of the line side fuse holder 24 to a position whereby the ridge 36 is capable of engaging with the line side housing 12, the ridge 36 may be provide with an inclined surface that extends downwardly towards the tower 27. It will be appreciated that the ridge 36 may be extended around the entire interior of the line side housing 12 or only a portion thereof as needed for any particular implementation. A similar latching feature may also be provided to the load side housing 14 for cooperating with the load side fuse holder 26.

Figure 5:
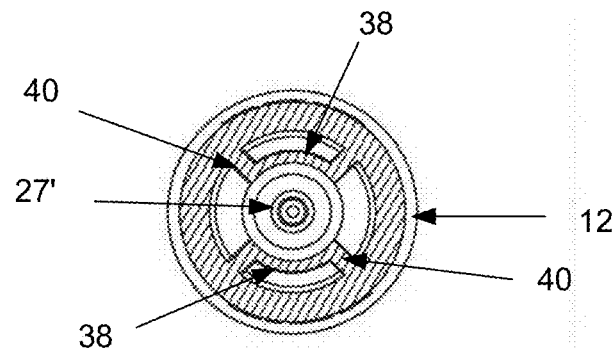
FIG. 5 illustrates a cross-sectional view of the line side housing along line B-B of FIG. 4.
Figure 4:
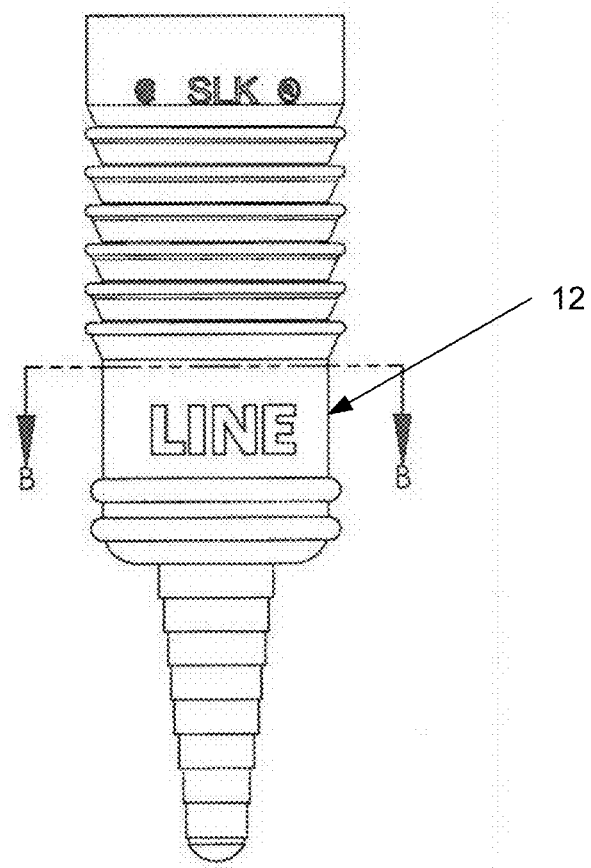
FIG. 4 illustrates a side view of the exemplary line side housing of FIG. 3.

For centering the fuse holding assembly 16 within the line side housing 12, i.e., along an axis of the fuse holder 10, centering features may be provided to the interior of the line side housing 12 in an area proximate to the interior end 27' of the tower 27. As particularly shown in FIGS. 4 and 5, the centering features may comprise a pair of opposed surfaces 38 which are extended into the line side housing 12 to a point where they are adapted to engage with the exterior surface of the line-side fuse holding assembly 24. As illustrated, the opposed surfaces 28 are spaced from the interior side of the line side housing 12 by spacing elements 40. In other embodiments, the spacing elements 40 may be eliminated with the opposed surfaces 28 then being extended directly from the interior of the line side housing 12. Additionally, while illustrated with a pair of opposed surfaces 28, it will be appreciated that one or more than two opposed surfaces 28 may be provided with the surface(s) 28 performing the same function of centering the fuse assembly 16 within the fuse holder 10.

Figure 3:
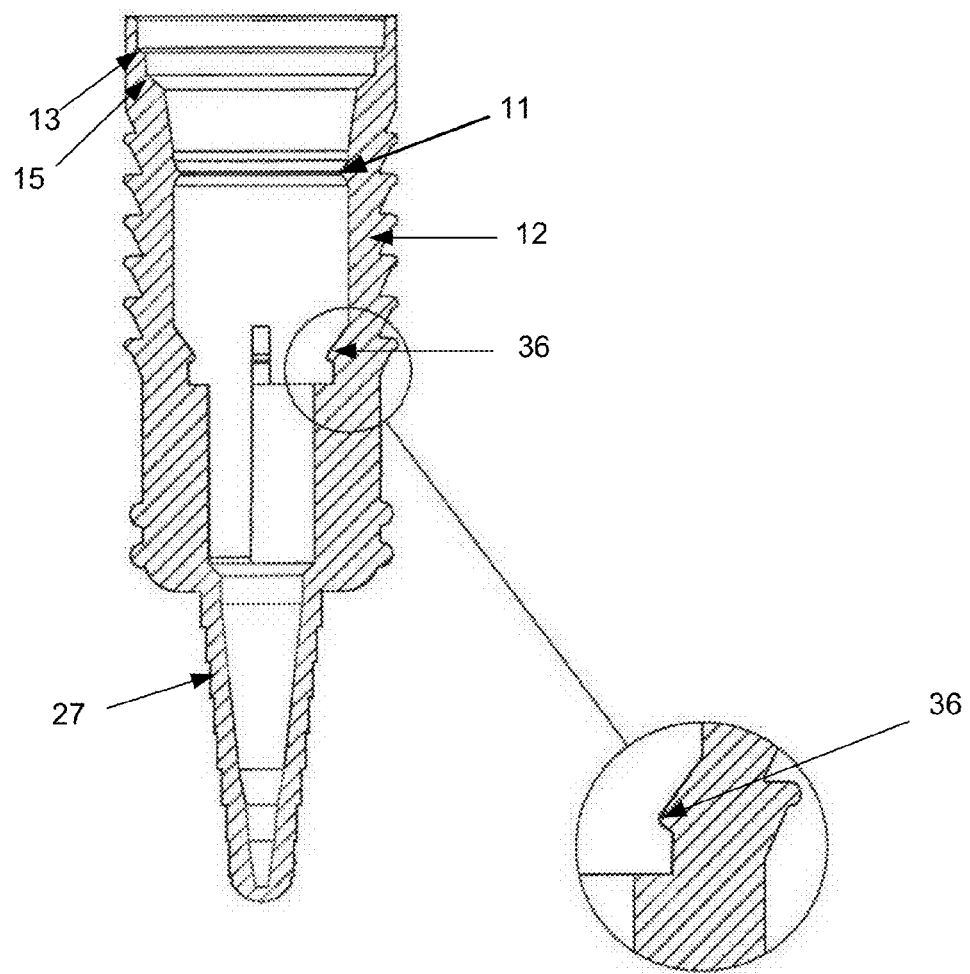
FIG. 3 illustrates a cross-sectional view of an exemplary line side housing of the fuse holding assembly of FIG. 1.

As further illustrated in FIG. 3, an inwardly extending ring 11 may be provided to the interior of the boot or boots to provide an additional seal between the boot and its respectively held fuse holder. While one ring 11 is illustrated in FIG. 3, it is to be appreciated that any number of inwardly extending rings could be provided around the inner diameter of the boot for this same purpose.

Turing to FIGS. 7-11, illustrated is an assembly wherein a web 50 is used to form a boot "pair" which can be either two "hot" conductors or one "hot" and one "neutral" conductor. As will be appreciated, the line side boot pair and the load side pair may thus be coupled together as described above to provide an assembly of the two wire in with two wire out type as particularly seen in FIG. 11. As further shown in FIGS. 7-10, the boot pairs are preferably provided with anti-rotational tabs 52 that protrude from the open end of the boots. When the anti-rotational tabs 52 are 180 degrees apart from each other, the boot pairs can be assembled into the fuse holder housing. However, when the anti-rotational tabs 52 are aligned with each other, the boot pairs cannot be assembled into a fuse holder housing (e.g., as shown in FIG. 7). The anti-rotational tabs 52 are thus useful to prevent a short circuit.

While specific embodiments of the subject invention have been described in detail, it will be appreciated by those skilled in the art that various modifications and alternatives to those details could be developed in light of the overall teachings of this disclosure. Accordingly, the particular arrangements disclosed are meant to be illustrative only and not limiting as to the scope of the invention which is to be given the full breadth of the appended claims and any equivalents thereof.

What is claimed is:

1. A device for holding an electric fuse assembly having a fuse carried by a first end fuse holder and a second end fuse holder, comprising:
   a first housing section having a cavity formed therein for receiving the first end fuse holder; and
   a second housing section having a cavity formed therein for receiving the second end fuse holder;
   wherein an end of the second housing section is separably coupled with an end of the first housing section by having an interior surface at the end of the first housing section being placed into overlapping engagement with an exterior surface of the second end fuse holder and an interior surface of the second end fuse holder being placed into overlapping engagement with an exterior surface at the end of the first housing section.

2. The device as recited in claim 1, wherein at least one of the first end fuse holder and the second end fuse holder are constructed from a polypropylene material.

3. The device as recited in claim 1, wherein at least one of the first housing section and the second housing section are constructed from a thermoplastic vulcanizate material.

4. The device as recited in claim 1, wherein the second housing section is adapted to latch to the second end fuse holder.

5. The device as recited in claim 4, wherein the second housing section comprises a ridge formed on an interior surface thereof sized and arranged to latch with a corresponding indentation provided to the second end fuse holder.

6. The device as recited in claim 5, wherein the ridge is provided with a slope that extends downwardly in a direction away from the rim of the second housing section.

7. The device as recited in claim 1, wherein the first housing section is adapted to latch to the first end fuse holder.

8. The device as recited in claim 7, wherein the first housing section comprises a ridge formed on the interior surface thereof sized and arranged to latch with a corresponding indentation provided to the first end fuse holder.

9. The device as recited in claim 8, wherein the ridge is provided with a slope that extends downwardly in a direction away from a rim of the first housing section.

10. The device as recited in claim 1, wherein the first housing section comprises a line side housing section and the second housing section comprises a load side housing section.

11. The device as recited in claim 1, wherein the first end fuse holder and the second end fuse holder are adapted to be placed into overlapping engagement with each other.

12. The device as recited in claim 11, comprising an o-ring for placement between the first end fuse holder and the second end fuse holder.

13. The device as recited in claim 1, wherein the interior surface at the end of the first housing section proximate to the end of the first housing section comprises first and second stepped surfaces adapted to engage with first and second surfaces provided to second end fuse holder.

14. A device for holding an electric fuse assembly having a fuse carried by a first end fuse holder and a second end fuse holder, comprising:
  a first housing section having a cavity formed therein for receiving the first end fuse holder; and
  a second housing section having a cavity formed therein for receiving the second end fuse holder;
  wherein an end of the first housing section is adapted to be separably coupled with an end of the second housing section whereupon respective surfaces of the first end fuse holder and the second end fuse holder are placed into overlapping engagement with each other.

15. The device as recited in claim 14, comprising an o-ring placed between the first end fuse holder and the second end fuse holder.

16. The device as recited in claim 14, wherein at least one of the first end fuse holder and the second end fuse holder are constructed from a from a polypropylene material.

17. The device as recited in claim 14, wherein at least one of the first housing section and the second housing section are constructed from a thermoplastic vulcanizate material.

18. The device as recited in claim 14, wherein the first end fuse holder has an extension and wherein the second end fuse holder has a cavity adapted to receive the extension and wherein respective surfaces of the extension and the cavity are placed into overlapping engagement.

19. A device for holding an electric fuse assembly having a fuse, a first end fuse holder, and a second end fuse holder, comprising:
  a first housing section having a cavity formed therein for receiving the end fuse holder; and
  a second housing section having a cavity formed therein for receiving the second end fuse holder;
  wherein the second housing section is adapted to be separably coupled to the first housing section and wherein the second housing section is adapted to latch to the second end fuse holder.

20. The device as recited in claim 19, wherein the second housing section comprises a ridge formed on an interior surface thereof sized and arranged to latch with a corresponding indentation provided to the second end fuse holder.

21. The device as recited in claim 20, wherein the ridge is provided with a slope that extends downwardly in a direction away from a rim of the second housing section.

22. The device as recited in claim 19, wherein the first housing section is adapted to latch to the first end fuse holder.

23. The device as recited in claim 22, wherein the first housing section comprises a ridge formed on an interior surface thereof sized and arranged to latch with a corresponding indentation provided to the first end fuse holder.

24. The device as recited in claim 23, wherein the ridge is provided with a slope that extends downwardly in a direction away from a rim of the first housing section.

25. The device as recited in claim 19, wherein at least one of the first end fuse holder and the second end fuse holder are constructed from a from a polypropylene material.

26. The device as recited in claim 19, wherein at least one of the first housing section and the second housing section are constructed from a thermoplastic vulcanizate material.

27. A device for holding an electric fuse assembly having a fuse, a first end fuse holder, and a second end fuse holder, comprising:
  a first housing section having a cavity formed therein for receiving the end fuse holder; and
  a second housing section having a cavity formed therein for receiving the second end fuse holder;
  wherein the second housing section is adapted to be separably coupled to the first housing section and wherein the second housing section has a centering component for centering the electric fuse assembly within the second housing section.

28. The device as recited in claim 1, wherein the second housing section has a centering component for centering the electric fuse assembly within the second housing section.

29. A device for holding a pair of electric fuse assemblies each having a fuse carried by a first end fuse holder and a second end fuse holder, comprising:
  a first housing section having a cavity formed therein for receiving the first end fuse holder of a first one of the electric fuse assemblies;
  a second housing section having a cavity formed therein for receiving the first end fuse holder of a second one of the electric fuse assemblies;
  a third housing section having a cavity formed therein for receiving the second end fuse holder of the first one of the electric fuse assemblies; and
  a fourth housing section having a cavity formed therein for receiving the second end fuse holder of the second one of the electric fuse assemblies;

wherein the first housing section and the second housing section are coupled by a web to form a first housing section pair, the third housing section and the fourth housing section are coupled by a web to form a second housing pair; and the first housing section and the second housing section are keyed to prevent miscoupling of the first housing section pair with the second housing section pair.

30. The device as recited in claim 29, wherein tabs provided to the first housing section pair and the second housing section pair cooperate to prevent miscoupling of the first housing section pair with the second housing section pair.

* * * * *